United States Patent
Kodaira et al.

(10) Patent No.: US 6,592,243 B2
(45) Date of Patent: *Jul. 15, 2003

(54) HEAD LAMP DEVICE FOR A VEHICLE (75) Inventors: Shigeru Kodaira, Saitama (JP); Kenichi Takeda, Saitama (JP); Tetsuya Suzuki, Saitama (JP); Toru Hasegawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/005,121

(22) Filed: Dec. 7, 2001

(65) Prior Publication Data
US 2002/0039297 A1 Apr. 4, 2002

Related U.S. Application Data (63) Continuation of application No. 09/124,901, filed on Jul. 30, 1998, now Pat. No. 6,334,701.

(30) Foreign Application Priority Data

Jul. 30, 1997 (JP) .................................................. 9-204717

(51) Int. Cl.⁷ ............................. B62J 6/00; F21V 33/00
(52) U.S. Cl. ........................................ 362/475; 362/544
(58) Field of Search ........................... 362/473, 475, 362/543, 544, 459

(56) References Cited

U.S. PATENT DOCUMENTS

| 4,513,357 A | 4/1985 | Nieda et al. ............... 362/228 |
| 4,539,627 A | 9/1985 | Ogishima .................... 362/72 |
| 5,140,504 A | 8/1992 | Sato ............................. 362/61 |
| 5,353,203 A | 10/1994 | Bertling et al. ............... 362/61 |
| 5,607,228 A | 3/1997 | Ozaki et al. | |
| 5,941,633 A | 8/1999 | Saito et al. ................. 362/543 |
| 6,334,701 B2 * | 1/2002 | Kodaira et al. ............. 362/475 |

FOREIGN PATENT DOCUMENTS

| DE | 42 31 538 | 4/1993 |
| DE | 196 32 908 | 2/1998 |
| EP | 0 718 150 | 6/1996 |
| GB | 2 297 148 | 7/1996 |
| GB | 2 308 649 | 7/1997 |
| JP | Y 2 63-9498 | 3/1988 |
| JP | A4-149901 | 5/1992 |
| JP | B2 2542962 | 7/1996 |

* cited by examiner

Primary Examiner—Mark A. Robinson (57) ABSTRACT

A head lamp device includes a structure in which a discharge lamp has a discharge bulb and a reflector of a substantially hemispheric shape arranged in an upper part of a housing. A filament including a filament bulb and a reflector of a substantially hemispheric shape is arranged in a lower part of the housing. The front opening of the lamp housing is covered by a front lens. The discharge bulb can generate two to three times as much luminous flux as a conventional filament bulb. As a result, it is possible to reduce the size of the discharge bulb as compared to the filament bulb. This makes it possible to reduce the overall size of the head lamp device.

9 Claims, 8 Drawing Sheets

HEAD LAMP DEVICE FOR A VEHICLE

This application is a continuation of co-pending application Ser. No. 09/124,901, filed on Jul. 30, 1998, now U.S. Pat. No. 6,334,701 the entire contents of which are hereby incorporated by reference and for which priority is claimed under 35 U.S.C. §120; and this application claims priority of Application No. 9-204717 filed in Japan on Jul. 30, 1997 under 35 U.S.C §119.

BACKGROUND OF THE INVENTION

1. Field of invention

The present invention relates to a head lamp device for a vehicle.

2. Description of Related Art

Figure 12:
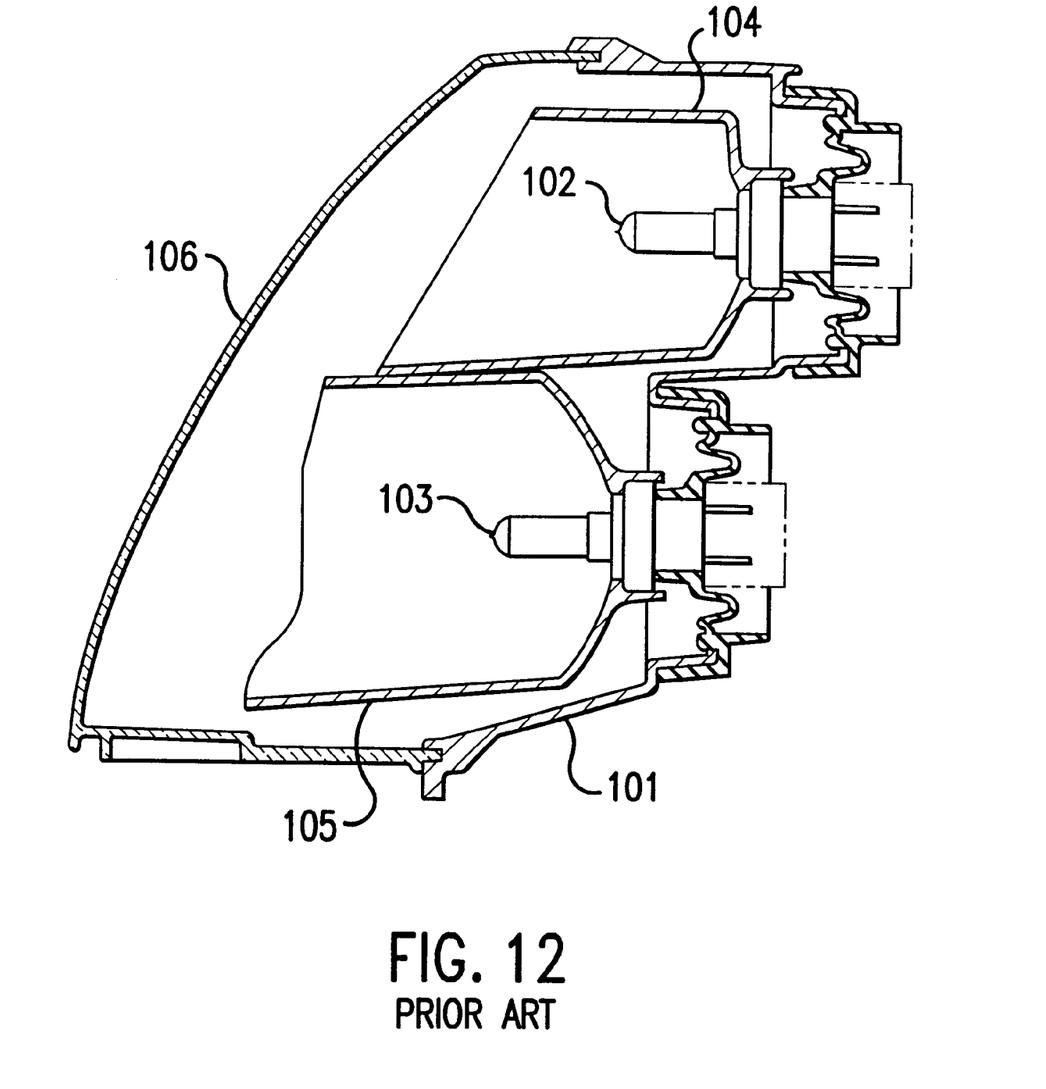
FIG. 12 a cross-sectional view of a conventional head lamp system with two vertically-arranged lamps.

A vehicle normally includes a head lamp device arranged at its front center. Although most of the front head lamp devices are of a single-lamp type, some are of a multiple-lamp type which include two or more lamps aligned relative to each other. For example, Japanese Utility Model Publication No. Sho 63-9493 entitled "An Automobile Head Lamp Device" discloses a pair of lamp units 16, 16 arranged side by side, as shown in FIG. 5 thereof FIG. 12 is a cross-sectional view of a conventional head lamp device including two lamps that are vertically arranged. This device has a structure in which filament bulbs 102, 103 are attached vertically to a lamp housing 101, and are respectively enclosed by reflectors 104, 105 having a substantially hemispheric shape. The front opening of the lamp housing 101 is covered by a front lens 106.

Note that the filament bulbs 102, 103 are general light bulbs having a filament as a light source. Inside the light bulb, a halogen gas is enclosed in order to suppress degrading of the filament. A halogen lamp is a typical example of such a light bulb.

On the other hand, a head lamp is obliged to perform the function of serving as a driving beam (hereinafter referred to as "high beam") and also as a passing beam (hereinafter referred to as "low beam"). Thus, one of the filament bulbs 102, 103 may be used as a high beam, while the other may be used as a low beam.

In this case, when using a low beam, only one bulb is turned on. Therefore, in order to obtain the necessary amount of luminous flux, a bulb of a large capacity or a reflector of a large size is needed. In order to install such a bulb or a reflector horizontally or vertically, the front lens inevitably has to be large. This makes it difficult to achieve the appearance desired for a vehicle.

Alternatively, a discharge lamp may be used, instead of a filament bulb, which can obtain a larger amount of luminous flux for lower power consumption. (For example, Japanese Patent No. 2542962). Discharge lamps employed for both of the two lamps will constitute a brighter head lamp which projects a front area of the same size. However, such a lamp results in increased weight and costs since each requires one high voltage generation circuit for lighting a discharge lamp.

SUMMARY AND OBJECTS OF THE INVENTION

In this view, the present invention aims to provide a head lamp device of a multiple-lamp type in which a high beam and low beam are generated by using separate bulbs. In particular, in such a device, the front lens thereof can be maintained at the desired area, or the necessary amount of luminous flux can be easily obtained. Moreover, an increase in demand and costs can be reduced.

In order to achieve the above object according to the present invention, there is provided a head lamp device for a vehicle, comprising a number of lamps each having a front lens, a bulb, and a reflector of a substantially hemispheric shape, wherein at least one of the lamps is a discharge lamp including a discharge bulb, and the remainder are filament lamps including a filament bulb, the filament lamps have a larger front-view area relative to the discharge lamp(s).

As a discharge lamp generates two or three times as much luminous flux as that generated by a filament lamp, an area taken up by a discharge lamp can be reduced to 60 to 70% of that which would be reserved for a filament lamp in order to generate the same or more light. As a result, the area for a filament lamp can be enlarged to 130 to 140% so that the filament lamp generates a sufficient amount of luminous flux.

That is, an amount of luminous flux as generated in the past can be generated by a head lamp with a front projection area that is smaller by several tens of %, or a head lamp with a front projection area as in the past can generate a larger amount of luminous flux by a few tens of %. For example, although a front projection area can be reduced when a project ion lamp is used for at least one of the two lights, the depth of the head lamp device tends to be larger. According to the present invention, the depth of a head lamp device remains small. Moreover, only a small number of lighting circuits are necessary compared to a case when two or more lighting bodies are all discharge lamps. That is, an increase in weight and costs can be suppressed since the number of lighting circuits is smaller than that of lighting bodies, namely, the number of light sources.

According to the present invention, the discharge lamp and the filament lamp are-arranged horizontally in a direction of the vehicle width so that a boundary between the discharge lamp and the filament lamp is offset towards the direction of vehicle width from a vehicle center.

Since a discharge lamp can be reduced in size, while a filament lamp can be enlarged, a head lamp device which generates a larger amount of luminous flux can be realized while maintaining a constant height and width of a head lamp device.

According to the present invention, the discharge lamp and the filament lamp are arranged vertically so that a boundary between the discharge lamp and the filament lamp is offset either upwardly or downwardly from a center in of the height of both lamps.

A head lamp device having a screen light distribution can easily achieve elongated light distribution characteristics. Each lamp has an elongated shape as a result of the lamps being arranged vertically, and preferable light distribution characteristics can therefore easily be achieved.

According to the present invention, the discharge lamp is used for a driving beam or high beam.

Since a discharge lamp which generates a larger amount of luminous flux is for the high beam, to illuminate a further distance, a broader area can be illuminated more brightly than with a filament lamp.

According to the present invention, a discharge lamp is used for a passing beam or low beam.

Since a discharge lamp which generates a larger amount of luminous flux is for a low beam, a sufficient amount of luminous flux can be generated despite the presence of a shielding plate used to bring about low beam light, and thus a more distant, broader area can be lit more brightly than with a filament lamp.

According to the present invention, the discharge lamp is arranged on a side of the center line of a road, and used for a driving beam or high beam.

The provision of a discharge lamp as a high beam on a side closer to the center line of a road inevitably achieves a low beam arranged farther from oncoming cars. This arrangement is preferable in that the low beam, which is used when the vehicle passes an oncoming car, causes the oncoming cars to be illuminated less as it is positioned far from the oncoming cars. Also, by placing the low beam closer to a sidewalk, pedestrians walking on the sidewalk can be easily recognized.

According to the present invention, the discharge lamp is arranged on a side of the shoulder of a road, and used is for a driving beam or high beam.

The provision of a discharge lamp as a high beam on a side closer to a shoulder inevitably achieves a low beam arranged closer to the center line of a road. The low beam can illuminate a road surface, including the center line, substantially equally on the right and left sides. Although the high beam lights an area farther from the center line, displacement is negligible as the illuminated area is far from the driver.

According to the present invention, the discharge lamp is arranged on an upper stage, and used for a driving beam or high beam.

The provision of a high beam for illuminating farther areas above a lower beam for illuminating closer areas can easily achieve preferable light distribution characteristics. Also, with a vehicle covered by a cowling that approaches the horizontal as it goes up, a filament lamp for a low beam is attached at a place closer to the vertical, while a discharge lamp for a high beam is attached at a place closer to the horizontal. The positioning of a low beam that requires severer light distribution characteristics as compared to a high beam is therefore much improved and preferable the overall light distribution characteristics can therefore be maintained.

According to the present invention, the discharge lamp is arranged on a lower stage and is used for a driving beam or high beam.

A discharge lamp requires a lighting circuit for generating a high voltage, which is very heavy. If the discharge lamp is then arranged at a lower stage with the heavy lighting circuit arranged alongside, the center of gravity of the vehicle can be lowered and a cord connecting with the discharge lamp can be shortened.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The preferred embodiments of the present invention will be described with reference to the accompanying drawings. Note that the drawings are to be reviewed by reference to the reference numerals.

Figure 1:
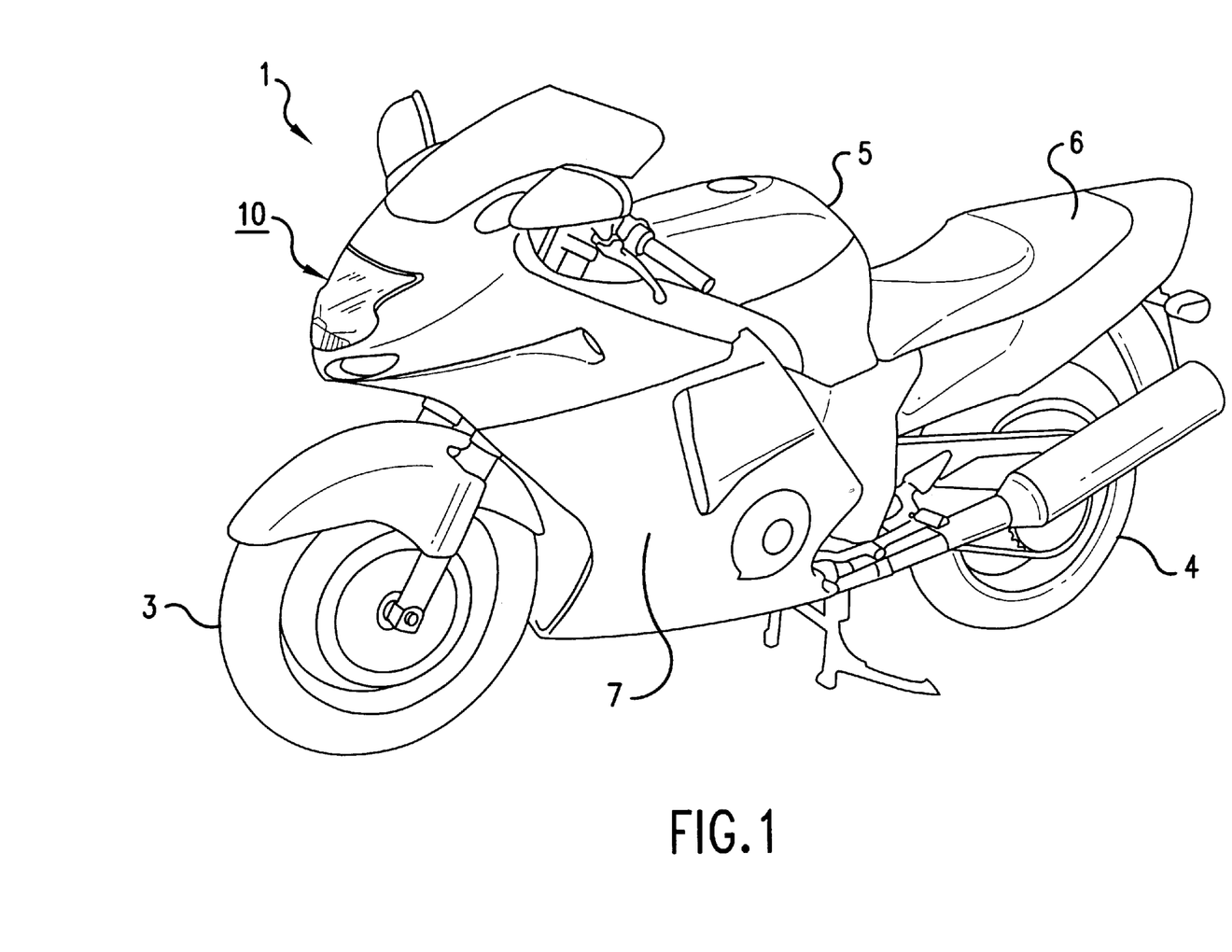
FIG. 1 is a perspective view of a vehicle having a head lamp device according to the present invention.

FIG. 1 is a perspective view of a vehicle having a head light device according to the present invention. The vehicle 1 includes a front wheel 3 and a rear wheel 4 arranged in the front and rear parts of a vehicle body, respectively. The vehicle 1 further includes a fuel tank 5 and a sheet 6 provided on the vehicle body in this order. The front part of the vehicle body is covered by a cowling 7, through which a head light device 10 is disposed.

Figure 2A:
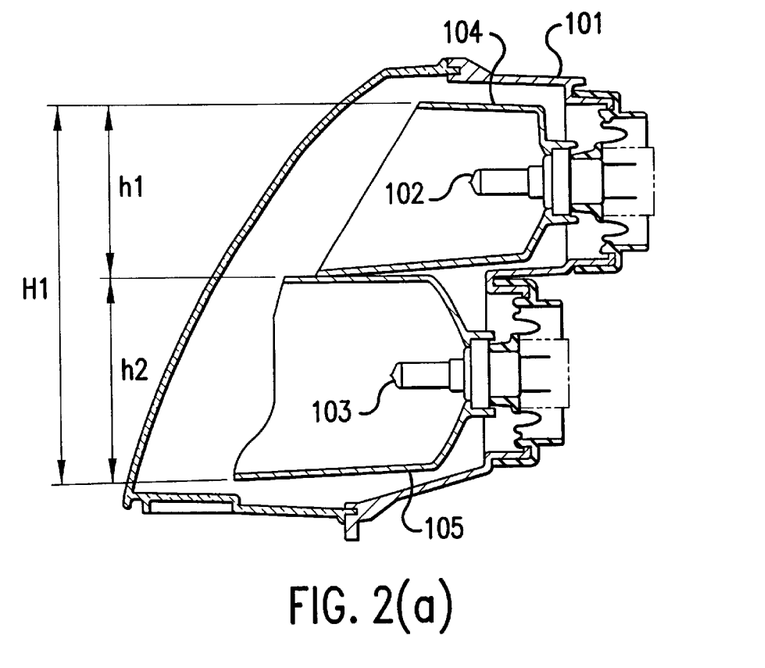
FIGS. 2(a) and 2(b) are diagrams showing comparison between a related example and a first embodiment of the present invention.
Figure 2B:
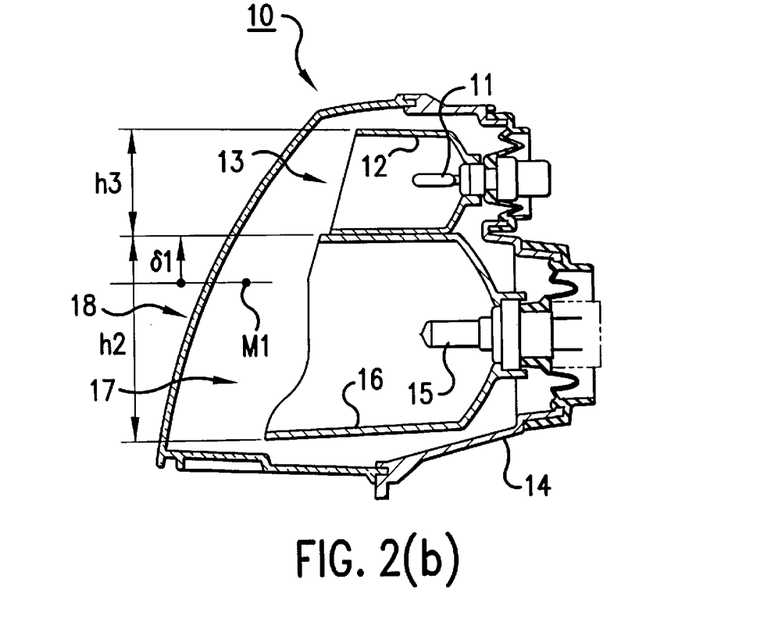

FIGS. 2(a) and 2(b) show a comparison between a related example and a first embodiment of the present invention. FIG. 2(a) shows a first comparative example, which is the same as that described referring to FIG. 12, and thus given the same reference numerals as those used in FIG. 12 with explanations thereof omitted. The height of the upper reflector 104 (a vertical dimension) is defined as h1. The height of the lower reflector 103 (a vertical dimension) is defined as h2. The total height of both reflectors 104, 105 is defined as H1.

FIG. 2(b) is a sectional view of a head lamp device of a first embodiment of the present invention. The head lamp device 10 has a structure in which a discharge lamp 13, having a discharge bulb 11 and a reflector 12 of a substantially hemispheric shape, is arranged in an upper part of a lamp housing 14. A filament 17 is provided having a filament bulb 15 and a reflector 16 of a substantially hemispheric shape which are arranged in a lower part of the lamp housing 14. The front opening of the lamp housing 14 is covered by a front lens 18.

Note that the discharge bulb 11 is what is called as a metal halide lamp. That is, metal vapor is enclosed in a glass sphere inside which a pair of electrodes are arranged opposite each other, and a high voltage is applied to the electrodes so that light is emitted through discharging.

A filament bulb 15 is a general light bulb using a filament as a light source.

The height of the lower reflector 16 is the same as that of the lower reflector 105 of FIG. 2(a), namely h2. On the other hand, the height of the upper reflector 12 is significantly lower than that of the upper reflector 104 of FIG. 2(a) and is defined as h3. Thus, the total height of both reflectors 12, 16, or (h2+h3), is significantly lower than H1 of FIG. 2(a).

This means that the boundary between the lamps 13 and 17 is offset upward from the center in height, or M1, of the head lamp system 10 by an extent δ1.

The discharge bulb 11 can generate two to three times as much luminous flux as compared to a conventional filament bulb 102. As a result, the discharge bulb 11 may be made smaller than the filament bulb 102. This means the entire head lamp device 10 can be made smaller.

Figure 3:
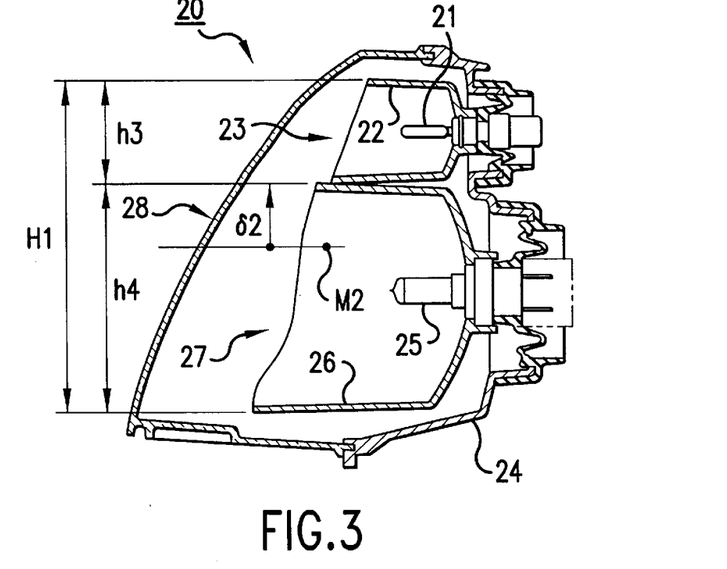
FIG. 3 is a sectional view of a head lamp device of a second preferred embodiment of the present invention.

FIG. 3 is a cross-sectional view of a head lamp device according to a second preferred embodiment of the present invention.

A head lamp device 20 has a structure in which a discharge lamp 23 having a discharge bulb 21 and a reflector 22 of a substantially hemispheric shape, is arranged in an upper part of a housing 24; a filament lamp 27 having a filament bulb 25 of a large diameter and a reflector 26 of a substantially hemispheric shape and a large diameter is arranged in a lower part of the housing 24. The front opening of the lamp housing 24 is covered by a front lens 28.

The device 20 has a height H1, similar to FIG. 2(a), in which a discharge lamp 23 and a filament lam 27 are arranged vertically. The height h4 is the vertical dimension of the lower filament lamp. The height h3 is the vertical dimension of the upper discharge lamp. The height h4, or the remainder of subtracting the height h3 of the upper reflector 22 from the height H1, is larger than h2 of FIG. 2(a) and the diameter of the lower filament 27 can therefore be made larger.

According to the second embodiment shown in FIG. 3, providing that the head lamp device has the same size as that of a conventional device, the filament lamp 27 can generate a larger amount of luminous flux than is conventionally generated.

In this example, the boundary between the lamps 23 and 27 is offset upwardly from the center of the height, or M2, of the head lamp system 20 by an extent δ2.

Figure 4:
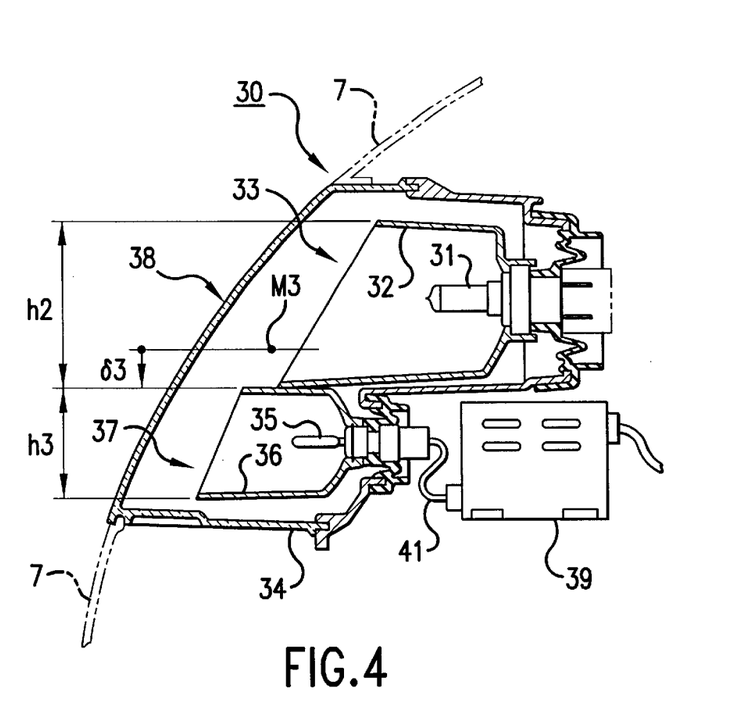
FIG. 4 is a sectional view of a head lamp device of a third preferred embodiment of the present invention.

FIG. 4 is a cross sectional view of a head lamp device according to a third preferred embodiment of the present invention.

A head lamp device 30 has a structure in which the upper and lower lamps of FIG. 2(b) are exchanged. Specifically, a discharge lamp 33 includes a discharge bulb 31 and a reflector 32 of a substantially hemispheric shape and having a height h2 are arranged in an upper part of a housing 34. A filament 37 having a filament bulb 35 and a reflector 36 of a substantially hemispheric shape and having a height h3 are arranged in a lower part of the housing 34; and the front opening of the lamp housing 34 is covered by a front lens 38.

In this example, the boundary between the lamps 33 and 37 is offset downwardly from the center in height, or M2, of the head lamp system 20 by an extent δ3.

As shown in the drawing, because the lamps 33, 37 are arranged along the inclined front lens 38, and the discharge lamp 37 is smaller than the filament lamp 37, a large space can be ensured behind (to the right in the drawing) the lower discharge lamp 37. A lighting circuit 39 for the discharge lamp 37 is then installed in this space.

The lighting circuit 39 is heavy because a high voltage generating circuit is included. With such heavy equipment situated in a relatively low place, the center of gravity of the device is lowered, which is preferable in view of the weight balance design of a vehicle body.

Further, a high voltage cord 41 connecting the lighting circuit 39 and the discharge lamp 37 is very short, which is preferable in view of the wiring design.

Figure 5A:
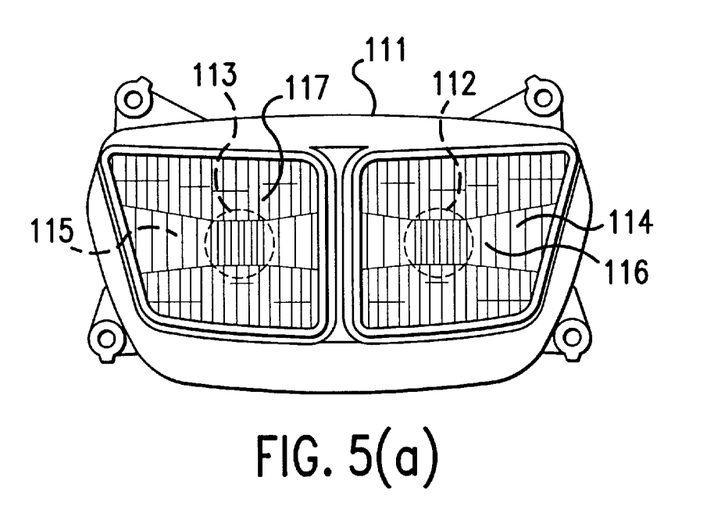
FIGS. 5(a) and 5(b) are diagrams showing a comparison between a second comparative example and a fourth embodiment of the present invention.
Figure 5B:
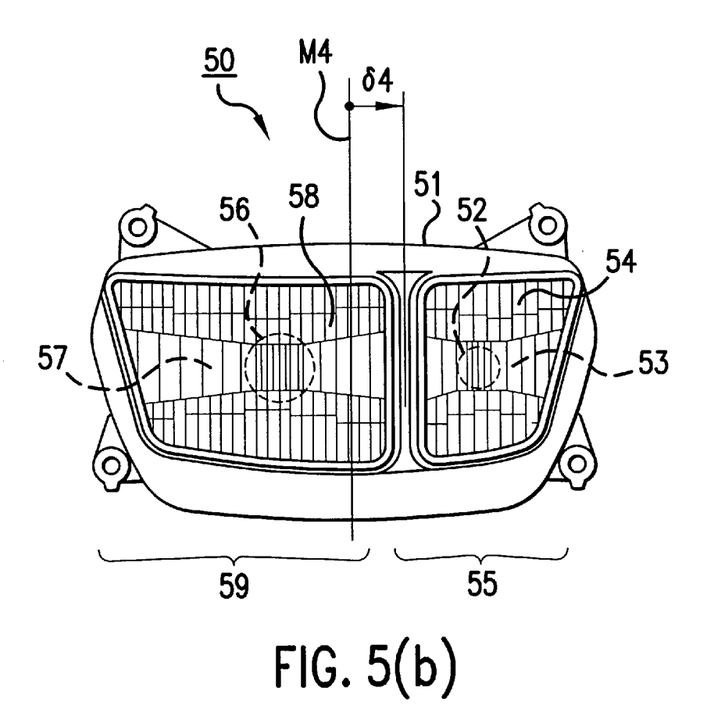

FIGS. 5(a) and 5(b) show a comparison between a second comparative example and a fourth preferred embodiment. FIG. 5(a) shows a conventional head beam device as a second comparative example, in which a pair of right and left filament bulbs 112, 113 and reflectors 114, 115 are accommodated in a lamp housing 111, and the front opening of the lamp housing 111 is covered by front lenses 116, 117.

FIG. 5(b) is a front view of a head lamp device 50 (a forth preferred embodiment) of the present invention. A head lamp device 50 is of a right/left two-lamp type, in which a discharge lamp 55 having a discharge bulb 52, a reflector 53, and a front lens 54 is arranged on the right side of a lamp housing 51 (in the drawing), and a filament lamp 59 having a filament bulb 56, a reflector 57, and a front lens 58 is arranged on the other side thereof.

Since the discharge lamp 55 is small in size, the filament lamp 59 on the other side can be made sufficiently large.

In this example, the boundary between the lamps 55 and 59 is offset from the center of the vehicle body, or M4, in the direction of the vehicle width by an extent δ4.

The operation of the head lamp devices described above will be described.

Figure 6:
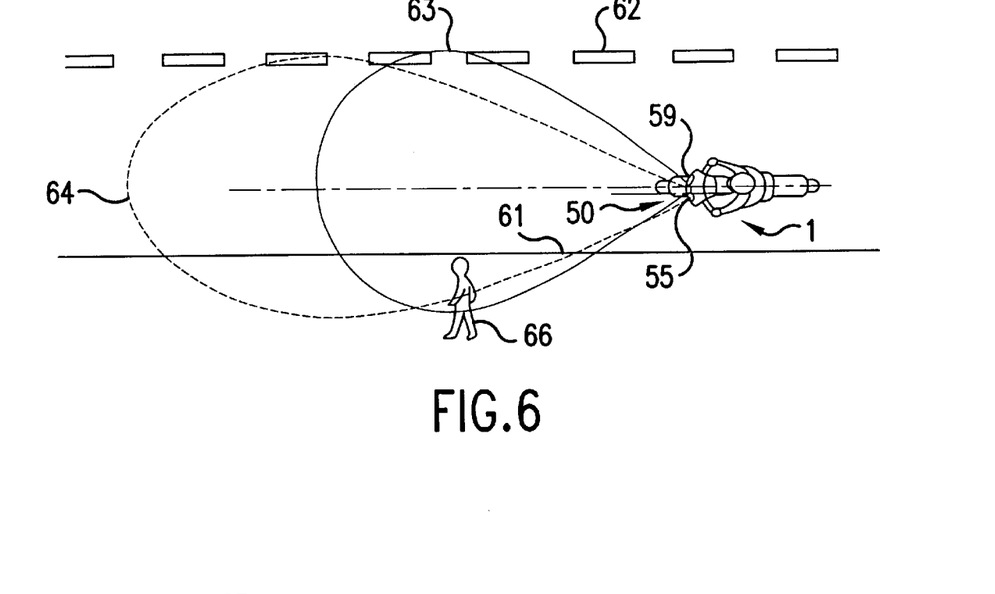
FIG. 6 is a diagram showing an operation of a head lamp device of a left/right two lamp type when passing on a left side.

FIG. 6 is a diagram showing the operation of a left/right two-light type head lamp device when the vehicle travels on the left side of a road. The vehicle 1 has a head lamp device 50 shown in FIG. 5(b), in which the discharge lamp 55 is used as a high beam and the filament lamp 59 is used as a low beam.

That is the discharge lamp, or high beam, is arranged on the shoulder 61 side, while the filament lamp 59, or a low beam, is on the center line 62 side. The low beam light 63 illuminates the road surface substantially equally on the right and left sides, while also illuminating the center line 62.

Although the high beam light 64 is slightly closer to the shoulder 61, a sense of discomfort may be so small as to be almost negligible because the high beam light 64 illuminates areas far from the driver.

Note that 66 indicates a pedestrian walking on a side road. Although the drawing is a plan view, the pedestrian 66 only is expressed as a side view so that the low beam light 63 illuminating the upper half of the pedestrians' body is shown.

Figure 7:
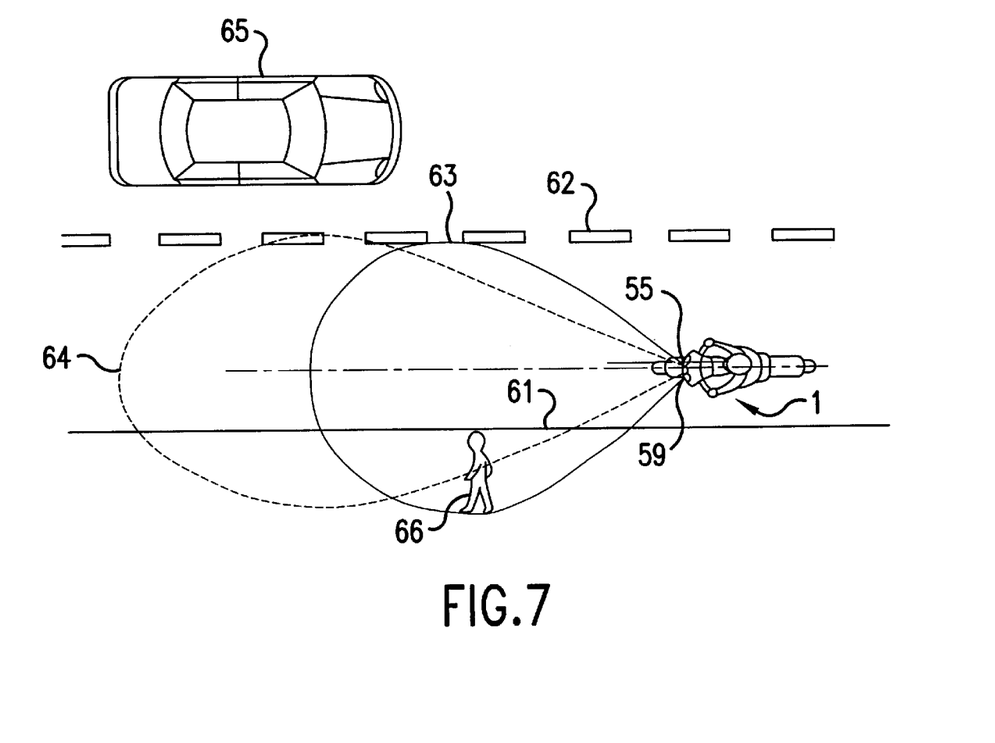
FIG. 7 is a diagram showing another operation of a head lamp device of a right/left two lamp type when passing on a left side.

FIG. 7 is a diagram showing another operation of a head lamp device of a right/left two-light type. This is the opposite of FIG. 5(b) with regards to left to right.

That is, the discharge lamp 55, or a high beam, is arranged on the center line 62 side, while the filament lamp 59, or a low beam, is on the shoulder 61 side. As the low beam light 63 is far from an oncoming vehicle 65, illumination effects caused by the low beam light 63 to the oncoming vehicles can be easily reduced, which is preferable. Further, as the shoulder 61 can be well-lit more easily, a pedestrian 66 can be more sufficiently recognized.

Figure 8:
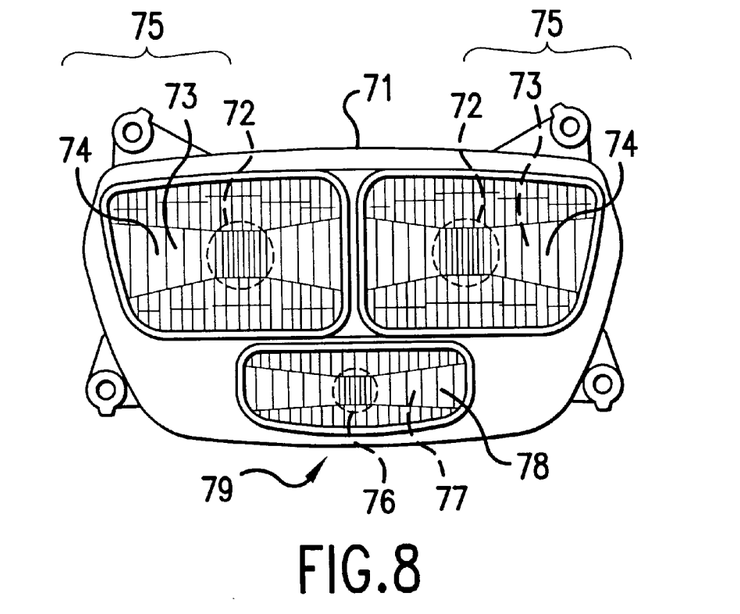
FIG. 8 is a diagram showing a head lamp device of a fifth preferred embodiment of the present invention.

FIG. 8 illustrates a head lamp device of a fifth embodiment of the present invention, in which a pair of filament lamps 75 each having a filament bulb 72, a reflector 73, and a front lens 74, are horizontally arranged in an upper part of a lamp housing 71, and one discharge lamp 79 having a discharge bulb 76, a reflector 77, and a front lens 78 is arranged on a lower stage thereof.

Figure 9:
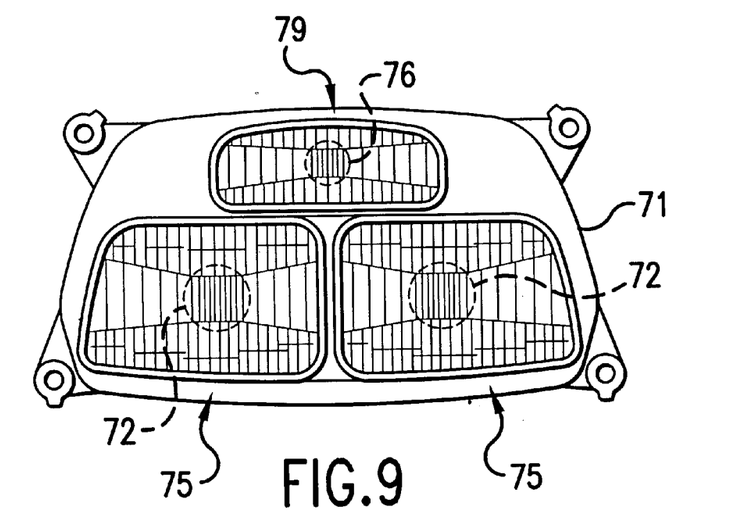
FIG. 9 is a diagram showing a head lamp device of a sixth preferred embodiment of the present invention.

FIG. 9 illustrates a head lamp device of a sixth embodiment of the present invention, in which lamps are arranged upside down compared to the arrangement shown in FIG. 8. The same reference numerals as those in FIG. 8 are used in FIG. 9, and detailed explanations are omitted.

Figure 10:
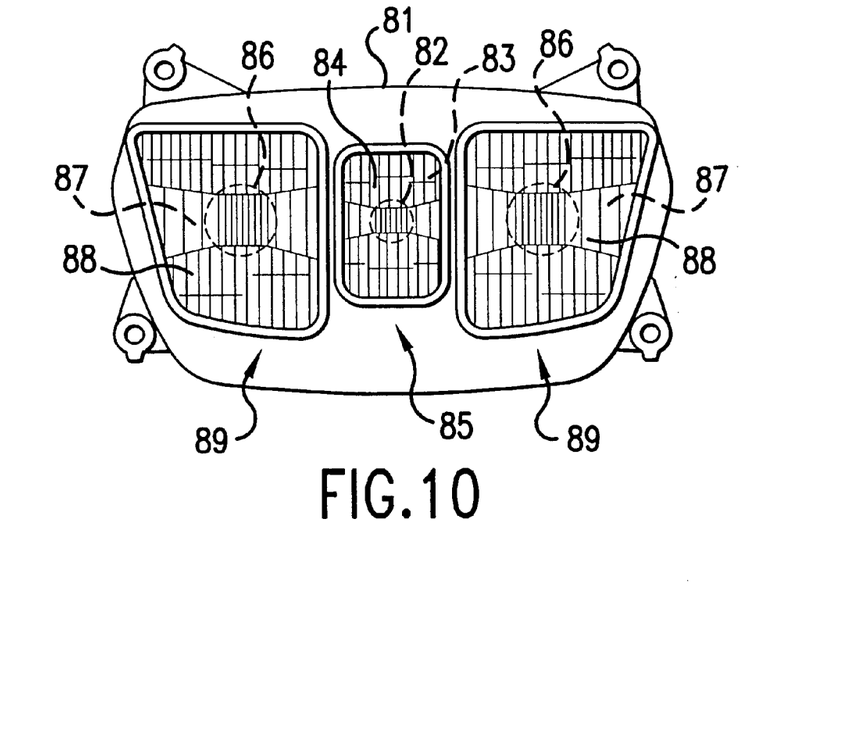
FIG. 10 is a diagram showing a head lamp device of a seventh preferred embodiment of the present invention.

FIG. 10 illustrates a head lamp device of a seventh embodiment of the present invention, in which one discharge lamp 85 having a discharge bulb 82, a reflector 83, and a front lens 84 is arranged at the center of a lamp housing 81, and filament lamps 89 each having a filament bulb 86, a reflector 87, and a front lens 88, are arranged one on each side for the left/right sides of the discharge lamp 85.

Figure 11:
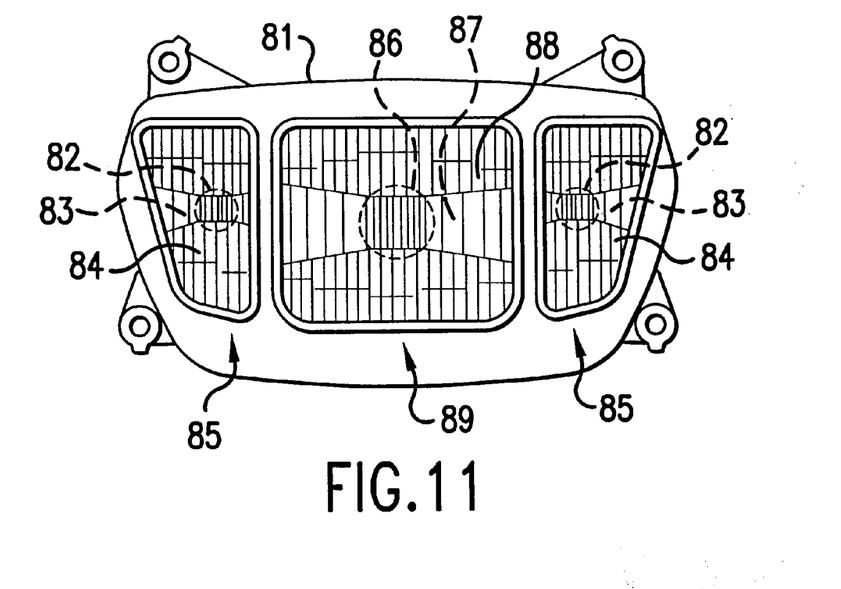
FIG. 11 is a diagram showing a head lamp device of a eighth preferred embodiment of the present invention.

FIG. 11 shows a head lamp device of an eighth embodiment of the present invention, in which a filament lamp 89 including a filament bulb 86, a reflector 87, and a front lens 88 is arranged at the center of a lamp housing 81, and discharge lamps 85 each having a discharge bulb 82, a reflector 83, and a front lens 84, are arranged one on each side for the left/right sides of the filament lamp 89.

The embodiments illustrated in FIGS. 8 to 11, include at least one of the lamps as a discharge lamp incorporating a discharge bulb, and the remainder are filament lamps incorporating a filament bulb, in which the filament lamp has a larger front-viewed area relative to the discharge lamp.

As a discharge lamp generates two or three times as many luminous flexes as that generated by a filament lamp, an area occupied by a discharge lamp can be reduced to 60 to 70% of that which would be occupied by a filament lamp in order to generate the same or more light. As a result, the area that a filament lamp is to occupy can be enlarged to 130 to 140% so that the filament lamp generates a sufficient amount of luminous flux.

That is, the same amount of luminous flux as in the past can be generated by a head lamp with a front projection area that is smaller by several tens of %, or a head lamp with a front projection area as in the past can generate a larger amount of luminous flux by several tens of %. For example, although a front projection area can be reduced when a projection ion lamp is used for at least one of the two lights, the depth of the head lamp device tends to be larger. According to the present invention, the depth of a head lamp device remains small. Moreover, only a smaller number of lighting circuits are necessary compared to a case when two or more lighting bodies are all discharge lamps. That is, an increase in weight and cost can be kept down since the number of lighting circuits is smaller than the number of lighting bodies (the number of light sources).

As shown in FIG. 5(*b*), a discharge lamp and a filament lamp are arranged horizontally in a direction of the vehicle width such that the boundary between the discharge lamp and the filament lamp is offset in a vehicle width direction from the center of the vehicle body.

Since a discharge lamp can be reduced in size, while a filament lamp can be enlarged, a head lamp device which generates a larger amount of luminous flux can be realized while maintaining constant a height and width of a head lamp device.

As shown in FIGS. 2(*b*), 3, 4, a discharge lamp and a filament lamp are vertically arranged such that the boundary between the discharge lamp and the filament lamp is offset either upwardly or downwardly from the center in the height of both of the lamps.

A head lamp device having a screen light distribution can easily achieve elongated light distribution characteristics. Each lamp has an elongated shape as a result of the lamps being arranged vertically, and preferable light distribution characteristics can therefore easily be achieved.

As shown in FIGS. 2(*b*), and 3 to 11, a discharge lamp is used as a high beam. Since a discharge lamp which generates a larger amount of luminous flux is used for the high beam, a more distant, broader area can be illuminated more brightly than with a filament lamp.

As shown in FIGS. 2(*b*) and 3 to 11, a discharge lamp is used as a low beam. Since a discharge lamp which generates a larger amount of luminous flux is used for a low beam, a sufficient amount of luminous flux can be generated despite the presence of a shielding plate used to bring about low beam light, and thus a more distant, broader area can be illuminated more brightly than with a filament lamp.

As shown in FIG. 7, a discharge lamp is arranged on the side of the center line of a road, and is used as a high beam. The provision of a discharge lamp as a high beam on a side closer to the center line of a road inevitably achieves a low beam arranged farther from oncoming cars. This arrangement is preferable in that the low beam, which is used when the vehicle passes by an oncoming car, causes oncoming cars to be illuminated less as it is positioned far from oncoming cars. Also, as a low beam is therefore placed closer to a sidewalk pedestrians walking on the sidewalk can be easily recognized.

As shown in FIG. 6, a discharge lamp is arranged on the side of the shoulder of a road, and is used as a high beam. The provision of a discharge lamp as a high beam on a side closer to a shoulder inevitably achieves a low beam arranged closer to the center line of a road. The low beam can illuminate a road surface, including the center line, substantially equally on the right and left sides. Although the high beam lights an area farther from the center line, displacement is negligible as the illuminated area is far from the driver.

The present invention is characterized by the fact that, as shown in FIGS. 2(*b*), 3, 9, a discharge lamp is arranged on an upper stage, and used as a high beam.

The provision of a high beam for illuminating farther areas above a lower beam for illuminating closer areas can easily achieve preferable light distribution characteristics. Also, with a vehicle covered by a cowling that approaches the horizontal as it goes up, a filament lamp for a low beam is attached at a place closer to vertical, while a discharge lamp for a high beam is attached at a place closer to horizontal. The positioning of a low beam that requires severer light distribution characteristics than a high beam is therefore much improved and preferable overall light distribution characteristics can therefore be maintained.

As illustrated in FIGS. 4 and 8 of the present invention, a discharge lamp is arranged on a lower stage, and is used for a high beam. A discharge lamp requires a lighting circuit for generating a high voltage, which is very heavy. If the discharge lamp is then arranged at a lower stage with the heavy lighting circuit arranged alongside, the center of gravity of the vehicle can be lowered and a cord connecting with the discharge lamp can be shortened.

Note that a front lens may be a type which covers bulbs one by one, or which covers a number of bulbs collectively.

The present invention having the above structure can provide the following advantages. Since at least one of a number of lamps of a head lamp device is a discharge lamp, it is possible to easily constitute a head lamp device which is smaller than a conventional device or which generates a larger than conventional amount of luminous flux.

For example, although a front projection area can be reduced when a project lamp is used for at least one of the two lights, the depth of the head lamp device tends to be larger. According to the present invention, the depth of a head lamp device remains small. Moreover, only a smaller number of lighting circuits are necessary compared to a case when two or more lighting bodies are all discharge lamps. That is, an increase in weight and costs can be kept down since the number of lighting circuits is smaller than that of lighting bodies (the number of light sources).

According to the present invention, a discharge lamp can be reduced in size while a filament lamp can be enlarged by employing an arrangement in which a discharge lamp and a filament lamp are arranged horizontally in a direction of the vehicle width. In this way, the boundary between the discharge lamp and the filament lamp is offset from the center of the vehicle body in the vehicle width direction. Thus, it is possible to constitute a head lamp device which generates a larger amount of luminous flux, while the height and width of the head lamp device remains the same.

According to the present invention, since a discharge lamp and a filament lamp are vertically arranged such that the boundary between the discharge lamp and the filament lamp is offset either upwardly or downwardly from the center in the height of the lamps, it is possible to reduce the size of the discharge lamp and enlarge that of the filament lamp. Moreover, thanks to the vertical arrangement of lamps, respective lamps have an elongated shape, as a result of which preferable light distribution characteristics can be easily obtained.

According to the present invention, since the discharge lamp is used as a high beam, it is possible to illuminate an area at a greater distant and broader areas more brightly than with a filament lamp.

According to the present invention, since the discharge lamp capable of generating a larger amount of luminous flux is used to provide a low beam, it is possible to obtain a sufficient amount of luminous flux despite the presence of a shielding plate which is used to bring about a low beam, and thus a more distant, broader area can be lit more brightly than with a filament lamp.

According to the present invention, since a discharge lamp is arranged on the side of the center line of a road, and used as a high beam, a low beam is inevitably arranged farther from oncoming cars. This arrangement is preferable in that the low beam, which is used when the vehicle passes by an oncoming car, causes oncoming cars to be illuminated less as it is positioned far from oncoming cars. Also, as a low beam is therefore placed closer to a sidewalk, pedestrians walking on the sidewalk can be easily recognized.

According to the present invention, since a discharge lamp is arranged on the side of the shoulder of a road, and used for a high beam, a low beam is inevitably arranged closer to the center line of a road. The low beam can illuminate a road surface, including the center line, substantially equally on the right and left sides. Although the high beam illuminates an area farther from the center line, displacement is negligible as the illuminated area is far from the driver.

According to the present invention, since a high beam for illuminating distant areas is arranged above and a high beam for lighting closer areas is arranged below, it is possible to easily obtain preferable light distribution characteristics.

Also, with a vehicle covered by a cowling that approaches the horizontal as it goes up, a filament lamp for a low beam is attached at a position closer to vertical, while a discharge lamp for a high beam is attached at a position closer to horizontal. The positioning of a low beam that requires severer light distribution characteristics than a high beam is therefore much improved and preferable overall light distribution characteristics can therefore be maintained.

According to the present invention, since a discharge lamp is arranged in a lower portion, it is possible to arrange a heavy lighting circuit side by side with the discharging lamp. As a result, the center of gravity of the vehicle can be lowered, and a high voltage cord connecting the discharge lamp and the lighting circuit can be shortened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A head lamp device for a vehicle, comprising:
    a plurality of lamps each having a front lens, a bulb and a reflector of substantially hemispheric shape, wherein
        one of said lamps is a discharge lamp including a discharge bulb, and another lamp is a filament lamp including a filament bulb, the filament lamp having a larger front-view area relative to the discharge lamps, and
        the front-view area of the discharge lamp is asymmetrical with respect to a longitudinal center line of the vehicle, the longitudinal center line of the vehicle passing through the head lamp device.

2. The head lamp device according to claim 1, wherein the discharge lamp and the filament lamp are arranged horizontally along a width direction of a forward part of the vehicle, wherein a boundary between the discharge lamp and the filament lamp is offset towards the direction of a center of the vehicle.

3. The head lamp device according to claim 1, wherein the discharge lamp and the filament lamp are arranged vertically so that a boundary between the discharge lamp and the filament lamp is offset either upwardly or downwardly from a center in a height direction of both lamps.

4. The head lamp device according to claim 1, wherein the discharge lamp is used as a driving, high beam.

5. The head lamp device according to claim 1, wherein the discharge lamp is used as a passing, low beam.

6. The head lamp device according to claim 1, wherein the discharge lamp is arranged on a side of a center line of a road, and used as a driving, high beam.

7. The head lamp device according to claim 1, wherein the discharge lamp is arranged on a side of a shoulder of a road, and used as a driving, high beam.

8. The head lamp device according to claim 1, wherein the discharge lamp is arranged on an upper stage, and used as a driving, high beam.

9. The head lamp device according to claim 1, wherein the discharge lamp is arranged on a lower stage, and used for a driving, high beam.

* * * * *